United States Patent
Park et al.

(10) Patent No.: US 8,644,308 B2
(45) Date of Patent: Feb. 4, 2014

(54) NETWORK INTERFACE CARD DEVICE AND METHOD OF PROCESSING TRAFFIC USING THE NETWORK INTERFACE CARD DEVICE

(75) Inventors: Sang Kil Park, Daejeon (KR); Sang Wan Kim, Daejeon (KR); Sang Sik Yoon, Gwangju (KR); Dong Won Kang, Daejeon (KR); Joon Kyung Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 229 days.

(21) Appl. No.: 12/973,815

(22) Filed: Dec. 20, 2010

(65) Prior Publication Data
US 2011/0149776 A1  Jun. 23, 2011

(30) Foreign Application Priority Data
Dec. 21, 2009 (KR) .................. 10-2009-0128019

(51) Int. Cl.
*H04L 12/28* (2006.01)
*G01R 31/08* (2006.01)

(52) U.S. Cl.
USPC ........................................ 370/389; 370/252

(58) Field of Classification Search
USPC ............... 370/252, 389, 392, 395.31, 395.54, 370/428–429
See application file for complete search history.

(56) References Cited

U.S. PATENT DOCUMENTS

| | | | |
|---|---|---|---|
| 2001/0047333 A1* | 11/2001 | Kim et al. ................. | 705/40 |
| 2006/0077963 A1* | 4/2006 | Li et al. ................... | 370/352 |
| 2006/0090016 A1 | 4/2006 | Edirisooriya | |
| 2007/0207727 A1* | 9/2007 | Song et al. .............. | 455/3.06 |
| 2010/0020798 A1* | 1/2010 | Jones ....................... | 370/392 |

FOREIGN PATENT DOCUMENTS

| | | |
|---|---|---|
| KR | 10-2008-0102889 A | 11/2008 |
| KR | 10-2009-0033677 A | 4/2009 |

* cited by examiner

*Primary Examiner* — Kwang B Yao
*Assistant Examiner* — Tung Q Tran

(57) ABSTRACT

Disclosed are a network interface card device and a traffic processing method using the network interface card device, the method including receiving a packet from a network, determining, by a first chipset, whether a detailed analysis is performed by verifying the received packet, and analyzing in detail, by a second chipset, with respect to a packet using the detailed analysis.

19 Claims, 5 Drawing Sheets

NETWORK INTERFACE CARD DEVICE AND METHOD OF PROCESSING TRAFFIC USING THE NETWORK INTERFACE CARD DEVICE

CROSS-REFERENCE TO RELATED APPLICATION

This application claims the benefit of Korean Patent Application No. 10-2009-0128019, filed on Dec. 21, 2009, in the Korean Intellectual Property Office, the disclosure of which is incorporated herein by reference.

BACKGROUND

1. Field of the Invention

The present invention relates to a network interface card device and method of processing traffic using the network interface card device, and more particularly, to a communication technology using an analysis and control with respect to high-speed traffic exceeding a 1 Gbps interface.

2. Description of the Related Art

A network speed of today is increasing at a speed exceeding Moore's Law. An increase in speed of a network interface may lead to a corresponding increase in traffic volume.

Regarding the traffic, a network service provider may operate a network without knowledge of a type of data being processed through a line serviced by the network service provider, and a percentage of traffic an applied program consumes. Depending upon circumstances of the network, regarding the high-speed traffic, a packet being of interest of a user may need to be analyzed in detail.

Regarding 1 Gbps traffic, a function of performing a deep packet inspection with respect to the traffic in an actual hardware line card may be easily performed. A number of theoretical and actual products relate to transmitting packet data to software via a direct memory access (DMA) buffer using a traffic offload engine (TOE), and analyzing the packet data.

SUMMARY

According to an aspect of the present invention, there is provided a network interface card device, including a packet reception unit to receive a packet from a network, a first chipset to verify the received packet, and to thereby perform a first analysis for determining whether a second analysis is to be performed, a second chipset to perform the second analysis m with respect to only a packet using the second analysis among received packets, and a packet transmission unit to transmit, to the network, the packet to which the first analysis or the second analysis is performed.

According to another aspect of the present invention, there is provided a traffic processing method of a network interface card device, the method including receiving a packet from a network, performing a first analysis for determining whether a second analysis is to be performed by verifying the received packet, performing the second analysis with respect to a packet using the second analysis among received packets, and transmitting, to the network, the packet to which the first analysis or the second analysis is performed.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
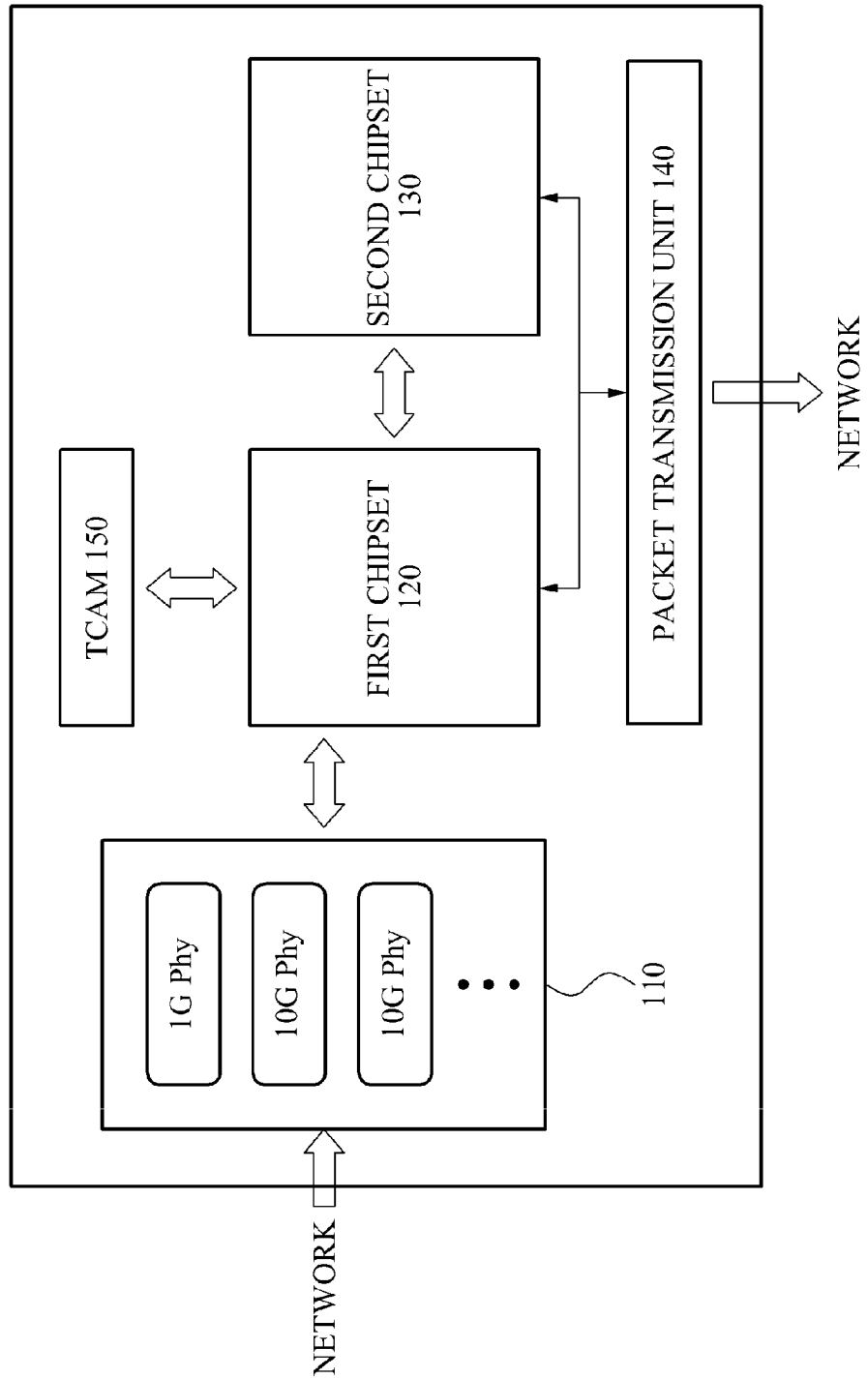
FIG. 1 is a block diagram illustrating a network interface card device according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a network interface card device 100 according to an embodiment of the present invention.

The network interface card device 100 may include a packet reception unit 110, a first chipset 120, a second chipset 130, a packet transmission unit 140, and a ternary content addressable memory (TCAM) 150. Using components of the network interface card device 100, a hardware structure enabling a passive traffic analysis and active traffic analysis may be provided.

The packet reception unit 110 may include a device having at least one physical layer (PHY), and may receive a packet from a network. The packet reception unit 110 may receive a huge volume of 10 Gbps traffic, and the huge volume of 10 Gbps traffic may be received from a network via at least one Media Access Control (MAC)/PHY.

The first chipset 120 may perform a first analysis for determining whether a second analysis is to be performed by verifying the received packet. For example, the first chipset 120 may be used as a traffic load offloading engine with respect to the received packet.

For example, the first chipset 120 may perform the first analysis with respect to the packet using at least one of source Internet Protocol (IP) address information, destination IP address information, source port information, destination port information, protocol information, and interface port information, of the received packet.

All packets received from a network interface may not be analyzed. Packets satisfying a predetermined rule may not undergo a detailed analysis, and may be directly transmitted to the network. Packets undergoing the detailed analysis may be analyzed in detail. Whether the detailed analysis is used may be determined by the first chipset 120.

The detailed analysis may be performed with respect to the packets undergoing the detailed analysis in the second chipset 130. Hereinafter, the detailed analysis may be defined as a second analysis.

The second chipset 130 may perform the second analysis with respect to a packet using the second analysis among received packets. For example, the second chipset 130 may perform the second analysis with respect to a payload portion of the packet.

The second analysis according to an embodiment of the present invention may include an analysis with respect to at least one of a packet type, charge information, whether a harmful pattern exists, a quality of service, a bandwidth on demand, and a deep packet inspection.

The charge information may be interpreted as at least one of charge information according to a use of an IP television (IPTV), charge information according to a use of a Voice over Internet Protocol (VoIP), and charge information according to a use of a wireless communication.

The packet transmission unit 140 may transmit, to the network, the packet to which the first analysis or the second analysis is performed.

The TCAM 150 may provide a criterion used for performing the first analysis by the first chipset 120. For example, the TCAM 150 may provide the first chipset 120 with a predetermined rule set by a user, and the rule may enable the first chipset 120 to perform a traffic classification.

The first chipset 120 may perform the traffic classification as the first analysis based on the predetermined rule set by the user, for example, a rule using a memory such as the TCAM 150, a static random access memory (SRAM), and the like.

As the first chipset 120, a chipset enabling processing of packets from two MAC/PHY (10 Gbps PHY) in full duplex may be used.

The packet reception unit 110 according to an embodiment of the present invention may perform a MAC address matching with respect to the received packet to respond to an attack such as a MAC flooding in a MAC address level.

The packet reception unit 110 may filter, by priority, a packet transferred to the first chipset 120 based on a MAC address matching result.

When determining of the MAC address of the received packet does not conform to a predetermined rule as a result of the MAC address matching, the packet reception unit 110 may transmit the received packet to the first chipset 120 for the first analysis.

When determining the MAC address of the received packet conforms to a predetermined rule as a result of the MAC address matching, the packet reception unit 110 may discard the received packet.

According to an embodiment of the present invention, by analyzing a packet using a detailed analysis, a waste of system resources may be reduced to enhance a process speed by not analyzing every received packet.

Generally, in a case of processing 10 Gbps traffic data, functions of a packet forwarding, an access control list (ACL) control, and the like may be performed, or the data may be divided into several cells through a load balancing, and the traffic analysis may be performed base on each cell. However, even though an actual traffic may flow through a single route, when the traffic data are divided into N cells to be analyzed, a loss of packet data may exist. Thus, significant information such as session information, and the like may not be properly used. According to an embodiment of the present invention, the traffic data may be processed in real time, without losing detailed information with respect to a huge volume of traffic exceeding 10 Gbps.

Figure 2:
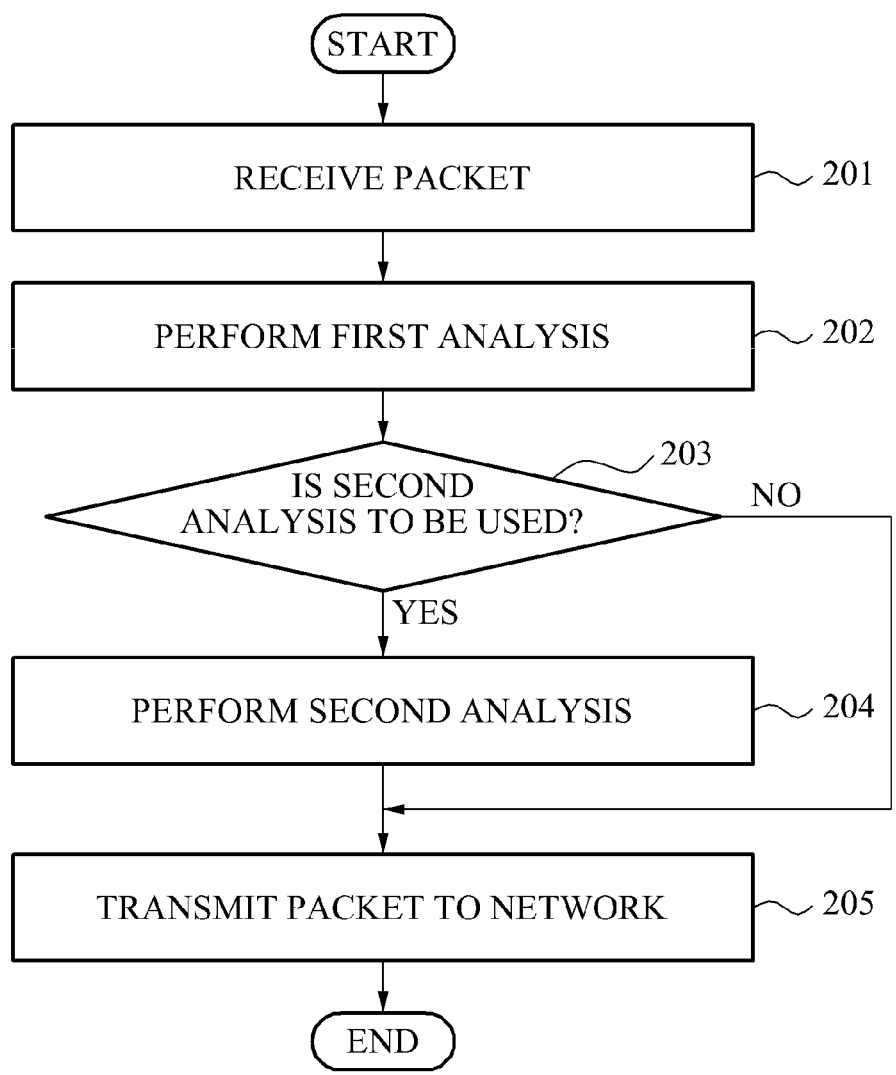
FIG. 2 is a flowchart illustrating a traffic processing method of a network interface card device according to an embodiment of the present invention.

FIG. 2 is a flowchart illustrating a traffic processing method of a network interface card device according to an embodiment of the present invention.

In operation 201, the method may receive a packet from a network.

In operation 202, the method may perform a first analysis for determining whether a second analysis is to be performed by verifying the received packet. In operation 203, the method may determine whether the second analysis is used based on the first analysis.

When the second analysis is determined to be used according to a determination result of operation 203, the method may perform the second analysis with respect to a packet using the second analysis among received packets in operation 204.

In operation 205, the method may transmit, to the network, the packet to which the first analysis or the second analysis is performed.

The method may perform an MAC address matching with respect to the received packet, and determining whether the first analysis is performed based on a result of the MAC address matching. For example, according to the result of the MAC address matching, the received packet may be discarded.

According to the result of the MAC address matching, operation 202 of performing the first analysis may perform the first analysis when determining an MAC address of the received packet does not conform to the predetermined rule.

Figure 3:
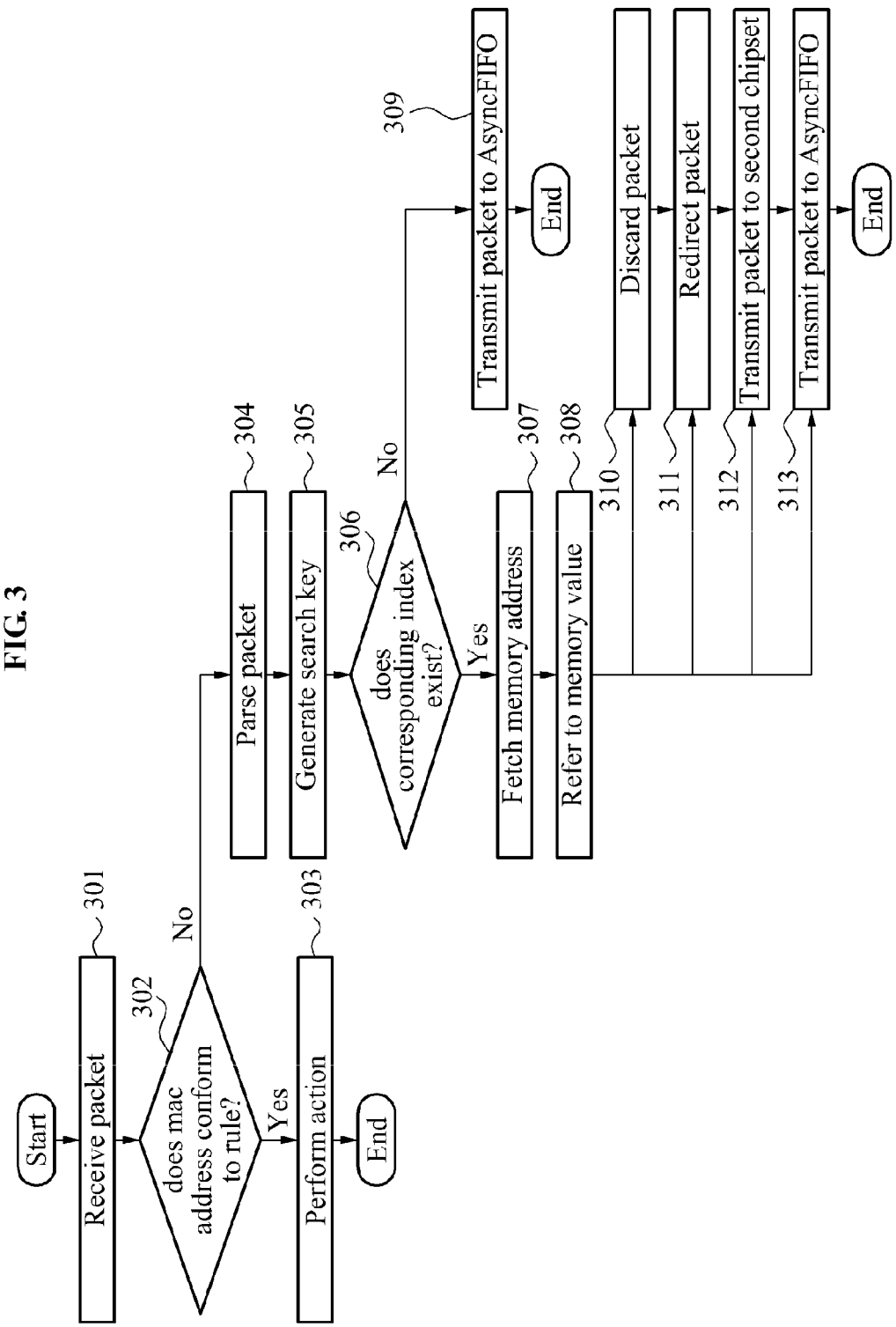
FIG. 3 is a flowchart illustrating an operation of a first chipset in a network interface card device according to an embodiment of the present invention.

FIG. 3 is a flowchart illustrating an operation of a first chipset in a network interface card device according to an embodiment of the present invention.

In operation 301, a traffic processing method according to an embodiment of the present invention may receive a packet from a network to an internal logic via a 10 Gbps MAC/PHY.

In operation 302, the method may perform an MAC address matching for a process of solving an attack such as an MAC flooding. When, as a result of the MAC address matching, a MAC address is determined to be blocked due to the MAC flooding, the method may perform an action such as discarding a packet, and the like, in operation 303.

When determining the MAC address does not conform to the rule, the method may parse the packet for information about IP header/Transmission Control Protocol (TCP), user datagram protocol (UDP), Internet Control Message Protocol (ICMP), and the like after removing an MAC header and extracting an L3 packet, in operation 304.

In operation 305, the method may generate a search key for checking a classification device including the TCAM or memory based on the packet data extracted through the packet parsing in operation 304. In operation 306, the method may perform a look up with respect to a packet classification rule using the generated search key.

When determining a corresponding index exists as a result of performing the look up respect to the packet classification rule, the method may fetch a predetermined memory address indicated by the index, in operation 307.

When determining the corresponding index does not exist as a result of checking the TCAM, the method may transmit the packet to an AsyncFIFO of the first chipset and storing the packet to transmit the packet to the network, in operation 309.

Thereafter, the packet stored in the AsyncFIFO may be transmitted to the network.

The method may fetch an address based on the index according to the TCAM search result. Then, the method may include, by referring to the corresponding memory value in operation 308 and according to a predefined case, performing responses such as discarding the packet in operation 310, redirecting the packet in operation 311, transmitting the packet to the second chipset in operation 312, transmitting the packet in operation 313, and the like.

Among the responses, the redirecting the packet in operation 311 may perform a procedure for transferring the received packet to the network, and transmitting the packet to a predetermined redirect page through a 1 Gbps PHY.

Figure 4:
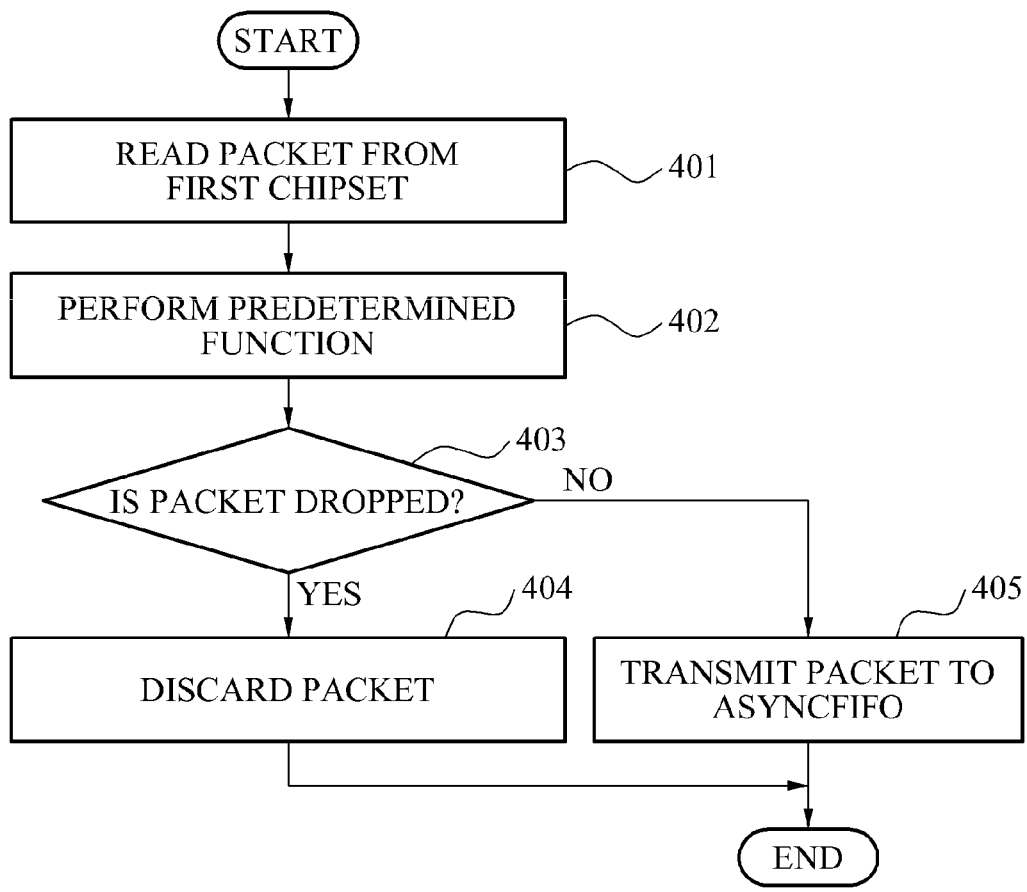
FIG. 4 is a flowchart illustrating an operation of a second chipset in a network interface card device according to an embodiment of the present invention.

FIG. 4 is a flowchart illustrating an operation of a second chipset in a network interface card device according to an embodiment of the present invention.

In operation 401, the second chipset according to an embodiment of the present invention may read, from a first chipset, a packet using a detailed analysis (a second analysis).

In operation 402, the second chipset may perform a predetermined function on a service such as a deep packet inspection, a traffic type, an analysis on harmful pattern, a traffic analysis, a quality of service, a bandwidth on demand, an IPTV charge, a VoIP charge, a wireless communication charge, and the like.

In operation 403, the second chipset may determine whether the packet is dropped based on the specified function.

When the packet is determined to be dropped, the second chipset may determine the current packet is harmful or needless, and discard the packet, in operation 404.

When the packet is determined to be not dropped, the second chipset may transmit the packet to the AsyncFIFO located in the first chipset to transmit the packet to the network, in operation 405.

Figure 5:
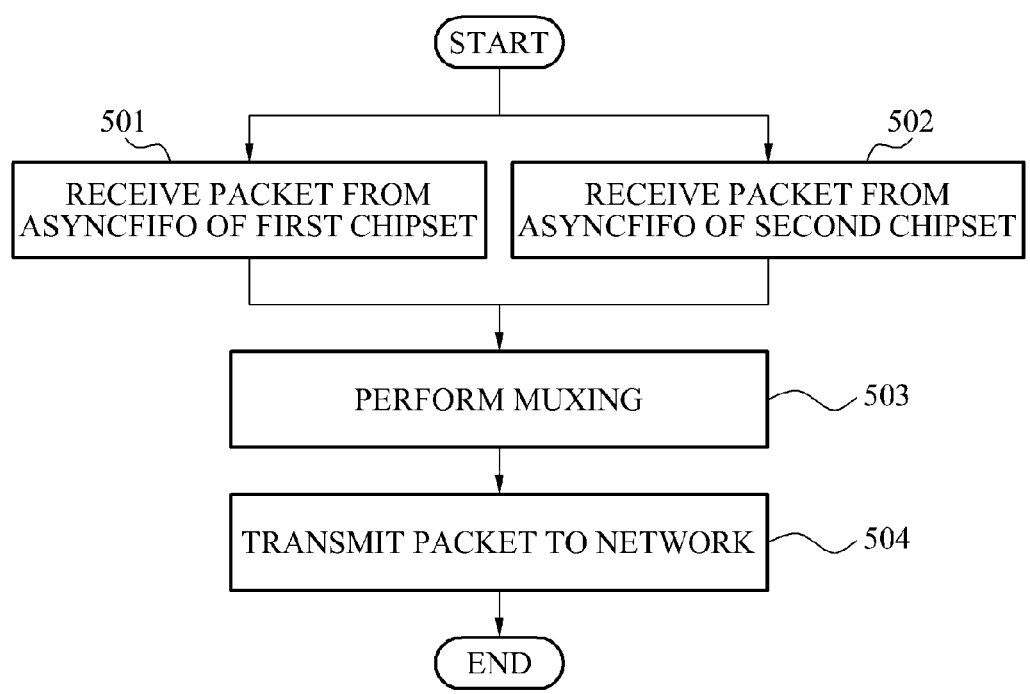
FIG. 5 is a flowchart illustrating a scheme for transmitting, to a network, a packet processed in a first chipset or a second chipset according to an embodiment of the present invention.

FIG. 5 is a flowchart illustrating a scheme for transmitting, to a network, a packet processed in a first chipset or a second chipset according to an embodiment of the present invention.

The scheme may receive a packet from an AsyncFIFO located in the first chipset in operation 501, and receive a packet from an AsyncFIFO located in the second chipset in operation 502. In operation 503, the method may perform a multiplexing (MUXing).

In operation 504, the MUXed packet may be transmitted to the network.

According to a packet response result value, the packet stored in the AsyncFIFO of the first chipset and the packet stored in the AsyncFIFO of the second chipset may be collected in the first chipset. In this instance, to prevent the collected packet from being overlapped and transmitted, the packet may be alternately extracted from the each AsyncFIFO.

Using a traffic processing method of a network interface card device according to an embodiment of the present invention, the packet may be processed in real time, without losing detailed information with respect to 10 Gbps traffic.

According to an embodiment of the present invention, by analyzing a packet using a detailed analysis, a waste of system resources may be reduced to enhance a process speed by not analyzing every received packet.

According to an embodiment of the present invention, a packet may be processed in real time, without losing detailed information with respect to a huge volume of traffic exceeding 10 Gbps.

The above-described exemplary embodiments of the traffic processing method of the network interface card device according to an embodiment of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A network interface card device, comprising:
a packet reception unit to receive a packet from a network;
a first chipset to perform a first analysis of the received packet;
a second chipset to perform a second analysis with respect to only a packet received from the first chipset; and
a packet transmission unit to transmit, to the network, the packet to which the first analysis or the second analysis is performed, wherein
the first chipset transmits the received packet to the second chipset when the first analysis determines that a first condition exists,
the first chipset transmits the received packet to the packet transmission unit when the first analysis determines that a second condition exists,
the second chipset transmits the packet received from the first chipset to the packet transmission unit when the second analysis determines that a third condition exists, and
the transmission unit multiplexes packets received from the first chipset and the second chipset.

2. The device of claim 1, wherein the first chipset performs the first analysis using at least one of source Internet Protocol (IP) address information, destination IP address information, source port information, destination port information, protocol information, and interface port information, of the packet.

3. The device of claim 1, wherein the second analysis is performed with respect to at least one of a packet type, charge information, whether a harmful pattern exists, a quality of service, a bandwidth on demand, and a deep packet inspection.

4. The device of claim 3, wherein the charge information corresponds to at least one of charge information according to a use of an IP television (IPTV), charge information according to a use of a Voice over Internet Protocol (VoIP), and charge information according to a use of a wireless communication.

5. The device of claim 1, wherein the first chipset discards the received packet if the first analysis determines that a fourth condition exists.

6. The device of claim 1, wherein the packet reception unit uses a MAC address of the received packet to determine that the received packet is not an attack and transmits the received packet to the first chipset.

7. The device of claim 6, wherein the packet reception unit uses a MAC address of the received packet to determine that the received packet is an attack and discards the received packet.

8. A traffic processing method of a network interface card device, the method comprising:
receiving a packet from a network;
performing, by a first chipset, a first analysis using the received packet;

when the first analysis determines that a first condition exists,
   transmitting the received packet from the first chipset to a second chipset,
   performing, by the second chipset, a second analysis using the received packet, and
   when the second analysis determines that a second condition exists, transmitting the received packet from the second chipset to the packet transmission unit;
when the first analysis determines that a third condition exists, transmitting the received packet from the first chipset to a packet transmission unit;
multiplexing, by the packet transmission unit, packets received from the first chipset and the second chipset and transmitting, to the network, the multiplexed packets.

9. The method of claim 8, further comprising if the first analysis determines that a fourth condition exists, discarding the received packet.

10. The method of claim 8, wherein performing the first analysis comprises performing the first analysis only when a process using a MAC address of the received packet determines that the received packet is not an attack.

11. The device of claim 1, further comprising a predetermined rule set;
   wherein the first chipset performs a traffic classification in the first analysis based on the predetermined rule set.

12. The device of claim 1, wherein the second chipset drops the packet received from the first chipset when the second analysis determines that a fourth condition exists.

13. The method of claim 8, further comprising:
   performing a traffic classification in the first analysis based on a predetermined rule set.

14. The method of claim 8, further comprising:
   determining whether the packet is dropped based on a specified function in the second analysis.

15. The method of claim 8, wherein performing the first analysis uses at least one of source Internet Protocol (IP) address information, destination IP address information, source port information, destination port information, protocol information, and interface port information, of the packet.

16. The method of claim 8, wherein performing the second analysis is performed with respect to at least one of a packet type, charge information, whether a harmful pattern exists, a quality of service, a bandwidth on demand, and a deep packet inspection.

17. The device of claim 1, wherein the first chipset redirects the received packet to a predetermined location on the network when the first analysis determines that a fourth condition exists.

18. The device of claim 1, wherein the first chipset transmits packets to the packet transmission unit using an AsyncFIFO and the second chipset transmits packets to the packet transmission unit using the AsyncFIFO.

19. The device of claim 1, wherein the first analysis includes performing a look up in a ternary content addressable memory (CAM) using a search key based on the received packet.

* * * * *